United States Patent
Yamagishi et al.

(10) Patent No.: US 8,717,341 B2
(45) Date of Patent: May 6, 2014

(54) DISPLAY APPARATUS WHICH ADJUSTS THE RESPONSIVITY OF THE DISPLAY BRIGHTNESS TO AMBIENT LIGHTING BASED ON THE TIME OF DAY

(75) Inventors: Nobuhiko Yamagishi, Tokyo (JP);
Yoshitomo Nakamura, Tokyo (JP);
Hideki Tanizoe, Tokyo (JP); Yoshihiro Ashizaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 329 days.

(21) Appl. No.: 13/140,961

(22) PCT Filed: Jan. 26, 2010

(86) PCT No.: PCT/JP2010/000426
§ 371 (c)(1),
(2), (4) Date: Jun. 20, 2011

(87) PCT Pub. No.: WO2010/089970
PCT Pub. Date: Aug. 12, 2010

(65) Prior Publication Data
US 2011/0254819 A1   Oct. 20, 2011

(30) Foreign Application Priority Data
Feb. 9, 2009   (JP) .................................. 2009-027196

(51) Int. Cl.
*G06F 3/038* (2013.01)
*G09G 5/00* (2006.01)
*G09G 3/36* (2006.01)
*H04N 5/57* (2006.01)
*H04N 5/58* (2006.01)

(52) U.S. Cl.
USPC ............................ 345/207; 345/102; 348/602

(58) Field of Classification Search
CPC ................ G09G 2360/144; G09G 2320/0653; G09G 3/3406; G09G 3/342; G09G 3/3426; G09G 2320/0626; G09G 2320/0633; G09G 2320/064; G09G 2320/0646; H04N 5/58
USPC .................. 345/60–104, 204–215, 690–699; 348/227.1, 366, 602–603, E5.12, 348/FOR. 204
See application file for complete search history.

(56) References Cited

U.S. PATENT DOCUMENTS 5,757,438 A * 5/1998 Yoon et al. ..................... 348/603
6,229,577 B1 * 5/2001 Barth et al. .................... 348/602
(Continued)

FOREIGN PATENT DOCUMENTS

CN    1822661 A    8/2006
JP    5-153519 A    6/1993
(Continued)

*Primary Examiner* — Chanh Nguyen
*Assistant Examiner* — Navin Lingaraju
(74) *Attorney, Agent, or Firm* — Birch, Stewart, Kolasch & Birch, LLP

(57) ABSTRACT

An image display apparatus is for correcting an input image signal and displaying an image on a display unit based on the corrected image signal, and includes: an illuminance detector for sequentially detecting illuminance values around the apparatus; an illuminance analyzer for sequentially outputting image settings for correction of the image signal depending on the detected illuminance values; a setting selector for outputting an image setting which has been output from the analyzer a number of times greater than a number of times any other image setting has been output, or an image setting determined by the statistic of the image settings output from the analyzer; and a setting application unit for changing the image setting used to correct the image signal to be equal to the image setting output from the selector, when a predetermined change occurs in the input image signal or when a predetermined time has come.

5 Claims, 7 Drawing Sheets

(56) References Cited

U.S. PATENT DOCUMENTS

| | | | |
|---|---|---|---|
| 2006/0181686 A1 | 8/2006 | Matsuda | |
| 2006/0221260 A1* | 10/2006 | Fujine et al. | 348/790 |
| 2007/0285569 A1* | 12/2007 | Nakamura et al. | 348/564 |
| 2008/0030450 A1* | 2/2008 | Yamagishi et al. | 345/89 |
| 2008/0186413 A1* | 8/2008 | Someya et al. | 348/739 |
| 2008/0204642 A1 | 8/2008 | Kobashi | |
| 2008/0215234 A1* | 9/2008 | Geelen | 701/200 |
| 2009/0174636 A1* | 7/2009 | Kohashikawa et al. | 345/87 |
| 2009/0244382 A1* | 10/2009 | Kimura | 348/571 |
| 2009/0262063 A1* | 10/2009 | Fujine et al. | 345/102 |
| 2010/0149145 A1* | 6/2010 | Van Woudenberg et al. | 345/207 |

FOREIGN PATENT DOCUMENTS

| | | |
|---|---|---|
| JP | 5-313626 A | 11/1993 |
| JP | 8-101673 A | 4/1996 |
| JP | 9-146073 A | 6/1997 |
| JP | 9-252342 A | 9/1997 |
| JP | 10-187096 A | 7/1998 |
| JP | 2000-111869 A | 4/2000 |
| JP | 2000-111872 A | 4/2000 |
| JP | 2001-502875 A | 2/2001 |
| JP | 2004-336107 A | 11/2004 |
| JP | 2005-6260 A | 1/2005 |
| JP | 2006-72255 A | 3/2006 |
| JP | 2006-285064 A | 10/2006 |
| JP | 2007-225650 A | 9/2007 |
| JP | 2008-70699 A | 3/2008 |
| JP | 2008-292904 A | 4/2008 |
| JP | 2008-134277 A | 6/2008 |
| JP | 2008-209558 A | 9/2008 |
| JP | 2008-219659 A | 9/2008 |
| JP | 2009-276702 A | 11/2009 |
| TW | 200701776 A | 1/2007 |
| TW | 200705347 A | 2/2007 |
| WO | WO 99/04562 A1 | 1/1999 |

* cited by examiner

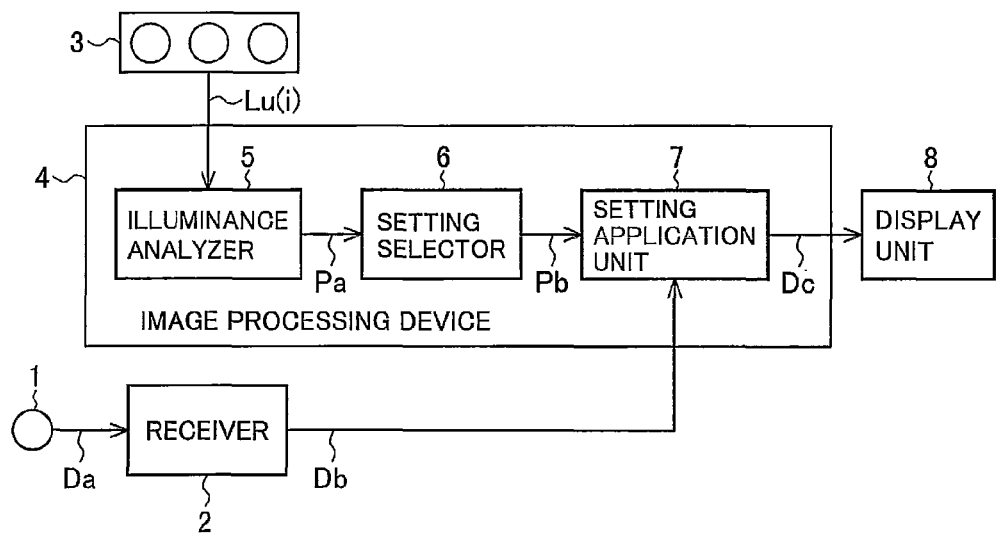

|  |  | Lud(1) | |
|---|---|---|---|
|  |  | LARGE | SMALL |
| Lud(2) | LARGE | (SETTING 1) P(1)<br><br>BRIGHTNESS CURVE: Yc(1)<br>PEAK BRIGHTNESS: Yp(1)<br>CONTRAST: Ct(1)<br>COLOR TONE: Cd(1) | (SETTING 2) P(2)<br><br>BRIGHTNESS CURVE: Yc(2)<br>PEAK BRIGHTNESS: Yp(2)<br>CONTRAST: Ct(2)<br>COLOR TONE: Cd(2) |
| | SMALL | (SETTING 3) P(3)<br><br>BRIGHTNESS CURVE: Yc(3)<br>PEAK BRIGHTNESS: Yp(3)<br>CONTRAST: Ct(3)<br>COLOR TONE: Cd(3) | (SETTING 4) P(4)<br><br>BRIGHTNESS CURVE: Yc(4)<br>PEAK BRIGHTNESS: Yp(4)<br>CONTRAST: Ct(4)<br>COLOR TONE: Cd(4) |

FIG.6

<table>
<tr><th rowspan="2">SETTING BEFORE APPLICATION PbBf</th><th colspan="5">SETTING TO BE APPLIED PbAf</th></tr>
<tr><th>P(1)</th><th>P(2)</th><th>P(3)</th><th>P(4)</th></tr>
<tr><td>P(1)</td><td></td><td>SETTING CHANGE: SMALL<br>TIMING A</td><td>SETTING CHANGE: MIDDLE<br>TIMING B</td><td>SETTING CHANGE: LARGE<br>TIMING C</td></tr>
<tr><td>P(2)</td><td>SETTING CHANGE: SMALL<br>TIMING A</td><td></td><td>SETTING CHANGE: SMALL<br>TIMING A</td><td>SETTING CHANGE: MIDDLE<br>TIMING B</td></tr>
<tr><td>P(3)</td><td>SETTING CHANGE: MIDDLE<br>TIMING B</td><td>SETTING CHANGE: SMALL<br>TIMING A</td><td></td><td>SETTING CHANGE: SMALL<br>TIMING A</td></tr>
<tr><td>P(4)</td><td>SETTING CHANGE: LARGE<br>TIMING C</td><td>SETTING CHANGE: MIDDLE<br>TIMING B</td><td>SETTING CHANGE: SMALL<br>TIMING A</td><td></td></tr>
</table>

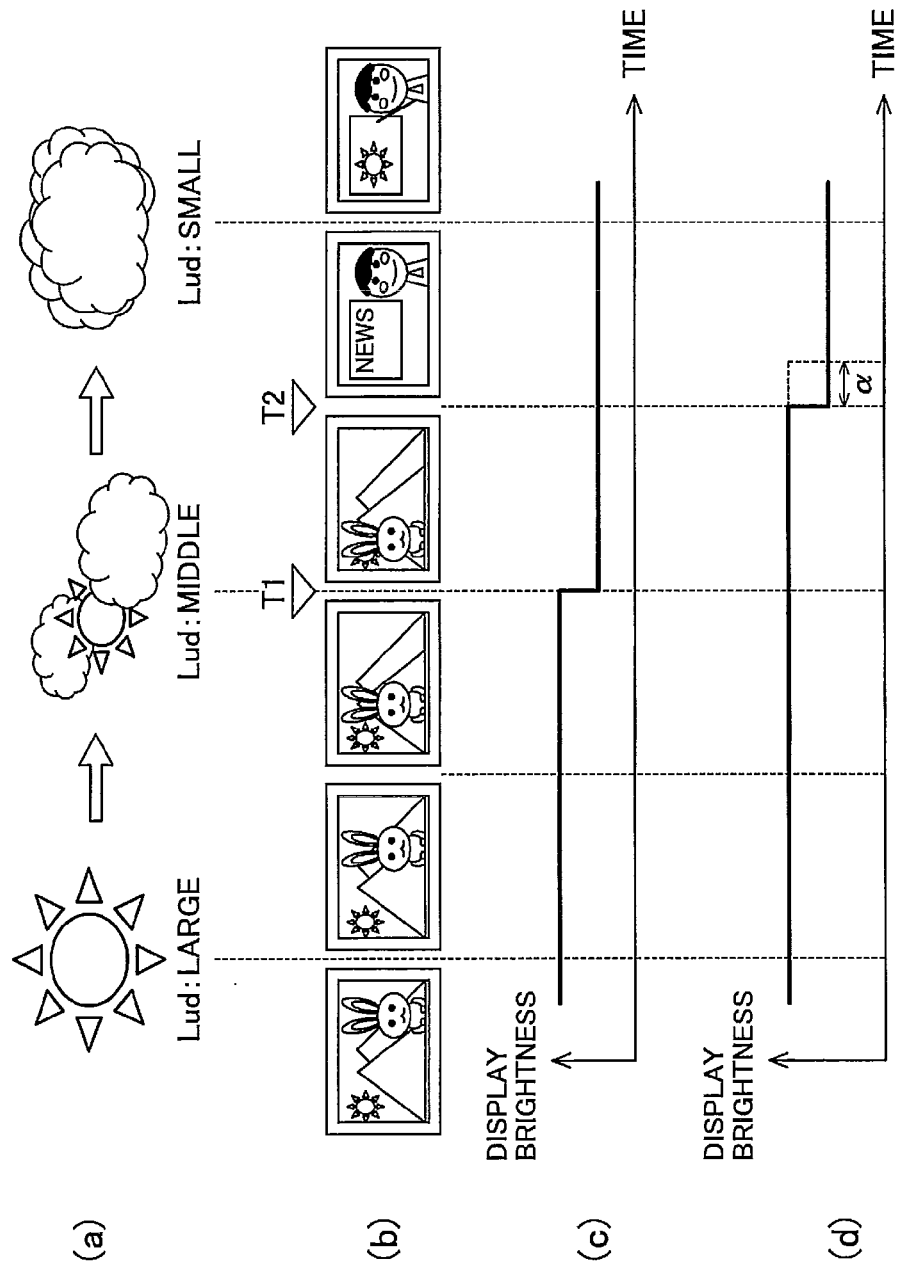

| | CONDITION | DESCRIPTION | VARIABLE | W |
|---|---|---|---|---|
| 1 | TIME: AM5~AM7 | DAYBREAK TIME | W(P4-P1) | 0.5 |
| 2 | TIME: AM5~AM7 | DAYBREAKE TIME | W(P1-P4) | 2 |
| 3 | TIME: PM5~PM7 | SUNSET TIME | W(P1-P4) | 0.5 |
| 4 | TIME: PM5~PM7 | SUNSET TIME | W(P4-P1) | 2 |
| | ⋮ | | | |

FIG.10

|  | Lud(1) | |
| --- | --- | --- |
|  | LARGE | SMALL |
| Lud(2) | (SETTING 1) P(1)<br><br>BRIGHTNESS CURVE: Yc(1)<br>PEAK BRIGHTNESS: Yp(1)<br>CONTRAST: Ct(1)<br>COLOR TONE: Cd(1)<br><br>SETTING FOR BRIGHT<br>AMBIENT ENVIRONMENT | (SETTING 2) P(2)<br><br>BRIGHTNESS CURVE: Yc(2)<br>PEAK BRIGHTNESS: Yp(2)<br>CONTRAST: Ct(2)<br>COLOR TONE: Cd(2)<br><br>SETTING FOR DARK<br>AMBIENT ENVIRONMENT |

FIG.11

| | CONDITION | DESCRIPTION | VARIABLE W | |
| --- | --- | --- | --- | --- |
| 1 | EVERY TIME (UNCONDITIONALLY) | DARK ADAPTATION | W(P1-P2) | 3 |
| | | BRIGHT ENVIRONMENT → DARK ENVIRONMENT | | |
| 2 | EVERY TIME (UNCONDITIONALLY) | LIGHT ADAPTATION | W(P2-P1) | 0.1 |
| | | DARK ENVIRONMENT → BRIGHT ENVIRONMENT | | |
| | ⋮ | | | |

DISPLAY APPARATUS WHICH ADJUSTS THE RESPONSIVITY OF THE DISPLAY BRIGHTNESS TO AMBIENT LIGHTING BASED ON THE TIME OF DAY

TECHNICAL FIELD

The present invention relates to an image display apparatus such as a digital television broadcasting receiver, and an image quality adjustment method for the image display apparatus.

BACKGROUND ART

Image quality setting preferred by the user for an image display apparatus varies depending on the ambient environment. Thus, there is an increasingly common technique in which an apparatus ascertains the ambient environment and performs image quality setting suitable for the environment for provision to the user. The apparatus can ascertain the ambient environment by various methods, e.g. by ascertaining the ambient brightness environment using an illuminance sensor, detecting movement of the viewer using an infrared sensor, or collecting ambient information by capturing an image of the surroundings by means of a video camera or the like, and analyzing the captured image.

One of the above-described methods adapted for many image display apparatuses uses a technique by which an ambient brightness environment is detected by an illuminance sensor and the display brightness is automatically adjusted to be suitable for viewing based on the detected brightness environment. For example, when the brightness environment is dark, it is possible to perform adjustment by reducing the screen brightness to the optimum brightness which does not dazzle the viewer. When, on the other hand, the screen brightness is insufficient in an extremely bright environment such as outdoors in fine weather (under direct sunlight), visibility becomes lower. The image quality adjustment based on the environment has been performed not only in the adjustment of the screen brightness, but also in various image quality settings such as contrast, black level, color density, and color temperature.

The image quality adjustment by an illuminance sensor is often used in a display apparatus used outdoors, such as a mobile phone, a public display (PD), a portable navigation device (PND), and an on-vehicle display, besides a display apparatus, such as a television, which is viewed indoors such as in an office or at home. Because brightness changes frequently outdoors, the image quality adjustment is frequently performed. Thus, natural image quality setting unlikely to discomfort the viewer, as well as application of the setting at a suitable timing is required.

A prior image display apparatus for performing image quality setting using an illuminance sensor is disclosed in Patent document 1. The display apparatus described in Patent document 1 sets the light-emission brightness and the timing for controlling brightness depending on the frequency of the change of the signal detected by an illuminance sensor. Patent document 2, for example, discloses another image display apparatus which performs brightness adjustment by using a plurality of illuminance sensors and calculating an average value, in an environment, such as outdoors, where brightness changes frequently.

PRIOR ART REFERENCES

Patent Documents

Patent document 1: Japanese Patent Application Publication No. 2000-111869

Patent document 2: Japanese Patent Application Publication No. H9-146073

SUMMARY OF THE INVENTION

Problems to be Solved by the Invention

In Patent document 1, control over brightness is performed upon a change of classification between a stable state and an unstable state. Furthermore, in an unstable state in which brightness changes rapidly, brightness is controlled with a short interrupt period. Such a control method is intended to let the viewer perceive the changes in image quality, and is often adopted in a small-sized image display apparatus such as a mobile phone. However, the change of image quality due to the image quality adjustment can discomfort the viewer and can also cause flicker. For example, in some display apparatuses such as a large-sized PD, the display area of the screen is large, and thus the above-described effects of the frequent brightness adjustment are greater than in a small-sized image display apparatus, and the adjustment method described in Patent document 1 is unsuitable.

The use of a plurality of illuminance sensors as shown in Patent document 2 is particularly effective for a large-sized display apparatus in that the variation in measured values is reduced. However, because an average of measured values is calculated and applied to the display apparatus in real time, it is difficult to perform natural adjustments which do not discomfort the viewer.

The present invention addresses the above problems; an object of the present invention is to obtain an image processing apparatus which can perform image quality settings suitable for the ambient environment without discomforting the viewer.

Means of Solution of the Problems

An image display apparatus according to the present invention is for correcting an input image signal and displaying an image on a display unit based on the corrected image signal, and includes:

an illuminance detector for sequentially detecting illuminance values around the image display apparatus;

an illuminance analyzer for sequentially outputting image settings for correction of the image signal based on the sequentially detected illuminance values;

a setting selector for setting a threshold value for each of the output image settings, and outputting the image setting which has been output from the illuminance analyzer a number of times greater than the threshold value; and a setting application unit for changing the image setting used to correct the image signal to be equal to the image setting output from the setting selector, when a predetermined change occurs in the input image signal and/or when a predetermined time has come.

Another image display apparatus according to the present invention is for correcting an input image signal and displaying an image on a display unit based on the corrected image signal, and includes:

an illuminance detector for sequentially detecting illuminance values around the image display apparatus;

an illuminance analyzer for sequentially outputting image settings for correction of the image signal based on the sequentially detected illuminance values;

a setting selector for outputting an image setting which has been output from the illuminance analyzer a number of times greater than a number of times any other image setting has been output, or an image setting determined by statistical processing of the image settings output from the illuminance analyzer; and a setting application unit for changing the image setting used to correct the image signal to be equal to the image setting output from the setting selector, when a predetermined change occurs in the input image signal and/or when a predetermined time has come.

Effect of the Invention

According to the present invention, image quality setting suitable for the ambient environment can be performed without discomforting the viewer.

BRIEF DESCRIPTION OF THE DRAWINGS

FIG. 1 is a block diagram illustrating a configuration of an image display apparatus according to a first embodiment of the present invention.

FIG. 2 is a diagram illustrating an example of image settings, for explaining the operation of an illuminance analyzer according to the first embodiment of the present invention.

FIG. 6 is a diagram for explaining the operation of a setting application unit according to the first embodiment of the present invention.

FIG. 7 is a diagram illustrating an example regarding an image setting application timing, for explaining the operation of the setting application unit according to the first embodiment of the present invention.

FIG. 10 is a diagram illustrating an example of image settings, for explaining the operation of the adaptive setting selector according to the second embodiment of the present invention.

FIG. 11 is a diagram illustrating an example of a setting made for weighting, for explaining the operation of the adaptive setting selector according to the second embodiment of the present invention.

MODES FOR CARRYING OUT THE INVENTION

First Embodiment

A-1. Configuration of Image Display Apparatus

Figure 3:
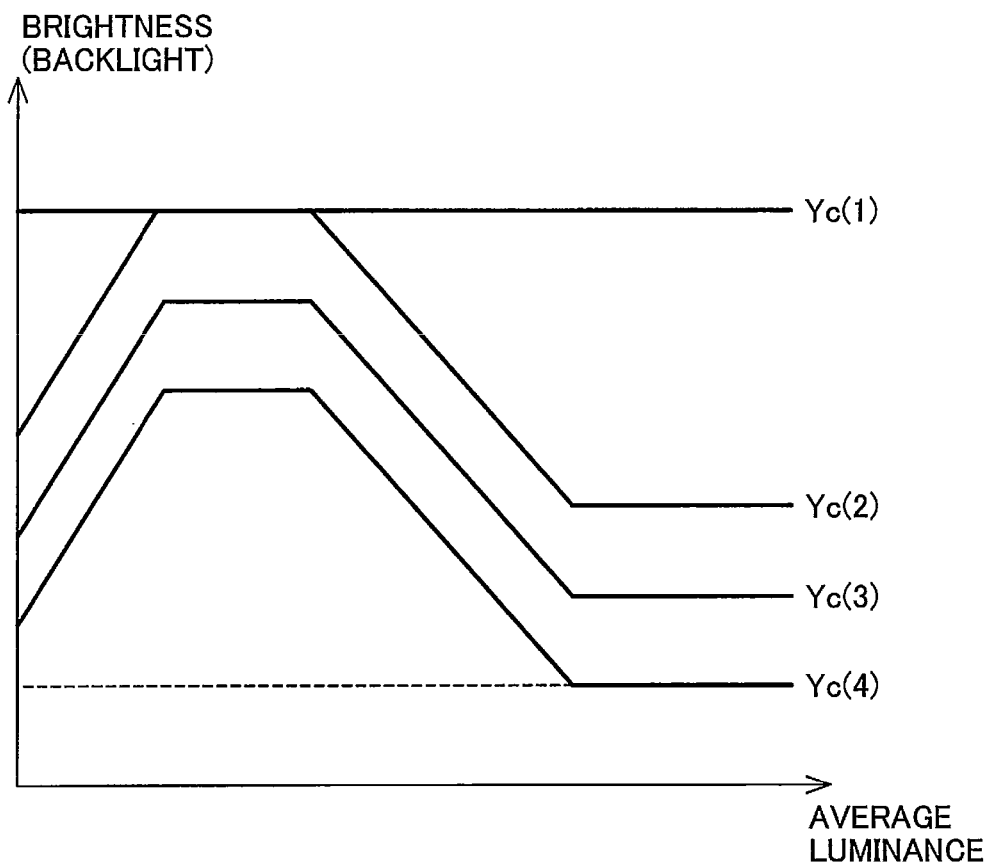
FIG. 3 is a diagram illustrating an example of image settings, for explaining the operation of the illuminance analyzer according to the first embodiment of the present invention.

FIG. 1 is a block diagram illustrating a configuration of an image display apparatus according to a first embodiment of the present invention. As illustrated in the diagram, the image display apparatus according to the first embodiment includes an input terminal 1, a receiver 2 for receiving a signal input to the input terminal 1, an illuminance sensor group 3, an image processing device 4 to which outputs from the receiver 2 and the illuminance sensor group 3 are input, and a display unit 8 for displaying an output from the image processing device 4.

The input terminal 1 receives an image signal Da having a predetermined format used in television, computers, or the like.

The receiver 2 receives the image signal Da through the input terminal 1, converts the image signal Da to a format processable by the image processing device 4, and outputs the corrected signal as an image signal Db. For example, the receiver 2 converts the image signal Da to several image information items in digital format such as luminance information Y and color difference information Cb, Cr, and then outputs the image information items as the image signal Db. The receiver 2 which performs the above-described operation includes, when the image signal Da is in an analog format, an A/D convertor or the like, and when the input image signal Da is in a digital format, a predetermined demodulator or the like suitable for the digital format.

The illuminance sensor group 3 measures an ambient brightness environment, and outputs an illuminance value Lu(i) having at least one value to the image processing device 4. Here, i denotes the number of illuminance sensors. For example, if the number of illuminance sensors is two, two values, Lu(1) and Lu(2), are output from the illuminance sensor group 3 to an illuminance analyzer 5 in the image processing device 4.

In this example, the illuminance sensor group 3 is composed of a plurality of illuminance sensors of the same kind. Instead of a plurality of illuminance sensors, only one illuminance sensor may be provided. If the number of illuminance sensors is one, a single value, Lu(1), is output from the illuminance sensor group 3 to the illuminance analyzer 5 in the image processing device 4. When i is equal to or greater than two, Lu(i) represents {Lu(1), . . . , Lu(i)} which is a group of a plurality (i) of illuminance values.

These illuminance sensors of the illuminance sensor group 3 do not necessarily need to be of the same kind; illuminance sensors of differing performance may be used.

Also, the illuminance sensor group 3 may use an illuminance sensor value from another image display apparatus placed in a nearby installation environment. That is, it is possible to obtain an illuminance value Lu(i) obtained from another image display apparatus via communication such as wired communication or wireless communication. Such a method is effective when only an illuminance sensor or sensors provided in a single image display apparatus are used, or when the number of illuminance sensors is insufficient.

The image processing device 4 performs image correction on the image signal Db input from the receiver 2 based on the illuminance value Lu(i) input from the illuminance sensor group 3, and outputs the corrected image information to the display unit 8 as an image signal Dc. Functional members for making the correction (the illuminance analyzer 5, a setting selector 6, and a setting application unit 7) will be described in detail later.

The display unit 8 displays an image based on the input image signal Dc. The display unit 8 is, for example, a liquid crystal display, a DMD (Digital Micromirror Device) display, an EL (ElectoroLuminescence) display, a plasma display, or a CRT (Cathode-Ray Tube) display, and may be any display means such as a reflective, transmissive, or self-emitting device.

<A-1-1. Configuration of Image Processing Device 4>

The configuration of the image processing device 4 in the image display apparatus will be described below.

The image processing device 4 includes the illuminance analyzer 5, to which the illuminance value Lu(i) from the illuminance sensor group 3 is input, the setting selector 6, and the setting application unit 7, to which the image signal Db output from the receiver 2 is input.

The illuminance analyzer 5 selects an image setting from a prescribed plurality of image settings based on the illuminance value Lu(i) input from the illuminance sensor group 3, and outputs the selected image setting to the setting selector 6 as a candidate setting Pa.

The setting selector 6 determines the final setting Pb of the image setting in the image display apparatus, by analyzing a number of candidate settings Pa input from the illuminance analyzer 5 corresponding to a predetermined time period in the time-series direction, and outputs the final setting Pb to the setting application unit 7.

The setting application unit 7 applies the final setting Pb input from the setting selector 6 as the image setting at a specified timing unlikely to discomfort the viewer. The setting application unit 7 performs a correction on the image signal Db obtained from the receiver 2 using the image setting which has been set, and outputs the corrected image signal to the display unit 8 as the image signal Dc.

A-2. Operation of Image Processing Device 4>

The operation of the image processing device 4 in the above-described image display apparatus will be described below for each component.

<A-2-1. Operation of Illuminance Analyzer 5>

The operation of the illuminance analyzer 5 provided in the image processing device 4 will be described below.

FIG. 2 illustrates an example of image settings for explaining the calculation of the candidate setting Pa from the illuminance value Lu(i) input from the illuminance sensor group 3 by the illuminance analyzer 5. In this example, the number of illuminance sensors is assumed to be two. That is, two values, Lu(1) and Lu(2), are input from the illuminance sensor group 3 to the illuminance analyzer 5.

In the illuminance analyzer 5, the illuminance values Lu(1) and Lu(2) are classified by using a predetermined threshold value Thl for determining the magnitude of each illuminance so that Lu(i) is classified as "large" if Lu(i) is greater than Thl, and Lu(i) is classified as "small" if Lu(i) is less than Thl. Here, the value after the classification by the threshold value will be denoted by Lud(i). A plurality of threshold values Thl may be set for plural Lu(i). For example, it is possible to set Thl(1) as the threshold value for Lu(1) and Thl(2) as the threshold value for Lu(2). Also, the number of the classes is not limited to two, and there may be any number of classes, e.g., the three classes "large", "middle", and "small". Furthermore, the number of the classes may vary for each illuminance value Lu(i). For example, it is possible to classify Lu(1) into the two classes of "large" and "small", and Lu(2) into the three classes of "large", "middle", and "small".

In the example of FIG. 2, when all of the illuminances at the positions where the sensors are located are high, Lud(1) and Lud(2) are "large". On the other hand, when all of the illuminances at the positions where the sensors are located are low, Lud(1) and Lud(2) are "small". The illuminances may differ depending on the placement positions of the sensors. For instance, Lud(1) may be "small" and Lud(2) may be "large". Also, Lud(1) may be "large" and Lud(2) may be "small". This may happen if, for example, light is incident from only one direction.

The illuminance analyzer 5 selects a specific setting from n prepared image settings P(n) based on the combination of the Lud(i), and outputs the selected setting to the setting selector 6 as the setting Pa. These settings are composed of a number of parameters, and in this example, the settings P(n) are respectively composed of a brightness curve Yc(n), a peak brightness Yp(n), a contrast Ct(n), and a color tone Cd(n). In this example, n is equal to four, and four image settings P(n) are prepared.

Each of the parameters constituting an image setting P(n) preferably corresponds to an ambient environment estimated from the illuminance value Lu(i). For example, if an image setting P(1) for a bright environment included a low brightness parameter, visibility would decrease. Accordingly, the brightness curve Yc(1) and the peak brightness Yp(1) are set to produce high brightness so that the viewer does not perceive the screen as being dark, and the perceived contrast Ct(1) is increased so as to improve the legibility of text. The color tone may be set to be deep so as to facilitate perception of color. The setting desired by the viewer also depends on the intended purpose, besides the ambient environment. Thus, it is preferable to make adjustments depending on the intended purpose and the environment.

In the above example, the candidate setting Pa is calculated from the illuminance value Lu(i) through a threshold classification. However, this is just one example, and any configuration may be employed, as long as the candidate setting Pa is selected from a prepared plurality of image settings P(n) based on the illuminance sensor value(s).

If the setting Pa output from the illuminance analyzer 5 were immediately applied to the display apparatus, a phenomenon such as flicker would be produced and visibility might decrease in installation conditions in which the brightness environment changes frequently. In particular, a display apparatus, such as a PD, which is often placed in an outdoor location or a situation where it is affected by direct sunlight may directly undergo a change in brightness environment, depending, for example, on the weather or the time of day. If the setting Pa were frequently switched due to the environmental changes, the viewer would be discomforted.

An example of a cause of viewer discomfort will be described. FIG. 3 illustrates examples of the brightness curves Yc(n) for the examples shown in FIG. 2. The brightness curves here are assumed to define the display brightness on the screen depending on the average luminance level of the image signal. In this example, Yc(1) maintains the display brightness at constant high brightness regardless of the average luminance of the image signal. Yc(2) to Yc(4) are characterized in that the display brightness is reduced when the average luminance of the image signal is low and when it is high.

In this example, when the ambient brightness environment changes significantly, the brightness curve varies from Yc(1) to Yc(4), and the brightness also changes significantly. If such a change of the image setting were applied without selecting the right timing, the discomfort and other effects of the brightness changes on the viewer would be large. As described below, the setting selector 6 and the setting application unit 7 are provided in order to reduce such effects.

<A-2-2. Operation of Setting Selector 6>

The operation of the setting selector 6 provided in the image processing device 4 will be described below.

The setting selector 6 determines the final setting Pb for use as the image setting in the image display apparatus by analyzing a number of candidate settings Pa input from the illuminance analyzer 5 corresponding to a predetermined time period in the time-series direction. Here, a condition value defining the number corresponding to the predetermined time period will be denoted by m, and the candidate settings input from the illuminance analyzer 5 at different times will be denoted by Pa(t).

Figure 4:
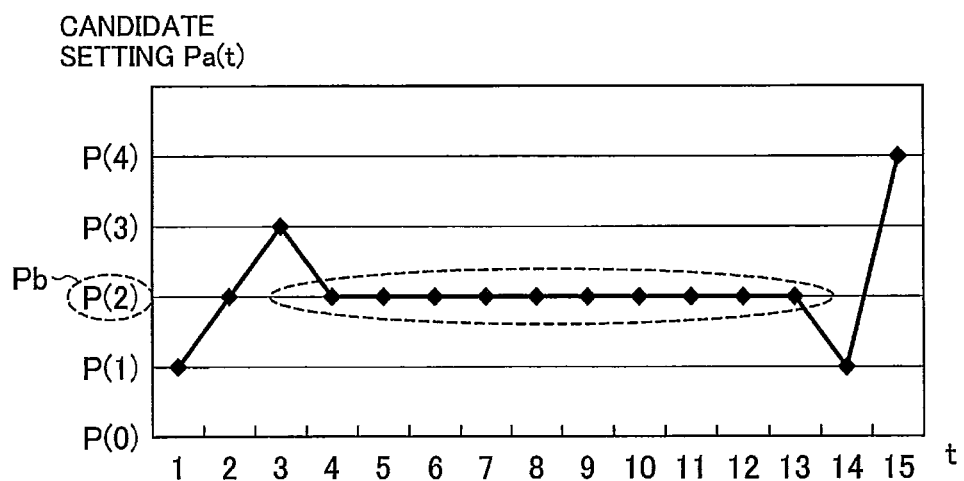
FIG. 4 is a diagram for explaining the operation of a setting selector according to the first embodiment of the present invention.

FIG. 4 illustrates an example of the analysis in the time-series direction with the predetermined time period condition value m by the setting selector 6. In this example, the condition value m is assumed to be equal to 10. The setting selector 6 performs analysis in the time-series direction based on the input candidate settings Pa(t), and when the same candidate setting is repeated consecutively a number of times defined by the condition value m, the setting selector 6 selects that candidate setting as the final setting Pb.

In this example, the first candidate setting which is repeated consecutively the number of times defined by the condition value is P(2), and thus P(2) is selected as the final setting Pb output to the setting application unit 7. Although, in this way, the number corresponding to the predetermined time period varies depending on the predetermined time period condition value m, the number need not be uniquely determined by m. That is, in this example, when m is assumed to be equal to 10, the determination is not always made from m analyzed illuminance values; the number of values that must be analyzed varies depending on how the Pa(t) change.

The analysis in the time-series direction may be made by a method in which the number corresponding to the predetermined time period is uniquely determined by the predetermined time period condition value m. For example, a method may be employed in which the setting selector 6 performs analysis in the time-series direction based on the input candidate settings Pa(t), and when a certain candidate setting has the maximum frequency of occurrence within the time period defined by the condition value m, selects that candidate setting as the final setting Pb.

Figure 5:
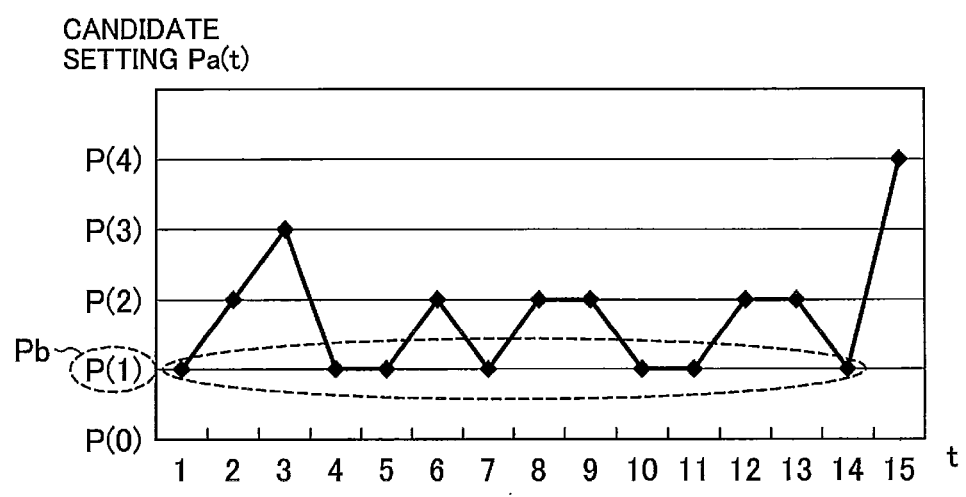
FIG. 5 is a diagram for explaining the operation of the setting selector according to the first embodiment of the present invention.

Specifically, as illustrated in FIG. 5, when the condition value m is assumed to be equal to 15, the number of occurrences of each candidate setting Pa(t) is counted over the period corresponding to 15 values specified by the condition value. In this example, the number of occurrences of the candidate setting Pa(t) is as follows. That of P(0) is zero, that of P(1) is seven, that of P(2) is six, and those of P(3) and P(4) are respectively one. The candidate setting Pa(t) having the maximum number of occurrences is P(1), which has been determined to have occurred seven times. Therefore, the final setting Pb is determined to be P(1).

Also, the setting selector 6 may calculate the final setting Pb by combining the above-illustrated analyses in the time-series direction for a plurality of different types or for a plurality of times. For example, the setting selector 6 may analyze the candidate settings using a condition value m1 to obtain Pb1, and then again analyze the Pb1's as inputs using another condition value m2 to obtain the final setting Pb. In this way, by combining a plurality of analyses to obtain the final setting Pb, it is possible to adjust the amount of analysis until the determination is made (speed of determination), or the accuracy.

It is also possible to adjust the amount of analysis until the determination is made (speed of determination), or the accuracy, by adjusting the number corresponding to the predetermined time period by means of the condition value and obtaining the final setting Pb.

Also, various methods other than those described above can be conceived regarding the analysis in the time-series direction. Although the calculation mechanism becomes complex, it is also possible to perform more complex analysis, by calculating statistics, such as an average value, a median value, a variance, or a standard deviation.

The predetermined time period condition value m may be further adjusted, by performing weighting based on ambient environmental conditions such as the time of day, sunshine conditions, the installation environment, or the characteristics of the viewer's vision. Details of an image processing device having this function will be described later as an adaptive setting selector 16 in a second embodiment.

<A-2-3. Operation of Setting Application Unit 7>

The operation of the setting application unit 7 provided in the image processing device 4 will be described below.

The setting application unit 7 applies the final setting Pb input from the setting selector 6 as the image setting at a specified timing unlikely to discomfort the viewer.

An example of a specified timing unlikely to discomfort the viewer is a time of a scene change in the image signal Db. Methods for detecting scene changes are well known, and thus a description thereof will be omitted. Around a scene change, many image elements are changed, and thus a parameter change of the image setting is less noticeable, and setting application unlikely to give discomfort can be realized by synchronizing the parameter change with the scene change.

Another example of a specified timing unlikely to discomfort the viewer is a time of a switching of broadcast channels or input signal sources. In this example, many image elements are changed, and thus a parameter change of the image setting is less noticeable, and setting application unlikely to give discomfort can be realized by synchronizing the parameter change with the change in the broadcast channel or the input signal source.

Another example of a specified timing unlikely to discomfort the viewer is a set time specified by the user. The application method using the set time is effective when it is known that a change of the image signal, the ambient environment, or the like occurs at the set time.

As an example, a change of the image signal, the ambient environment, or the like occurs at the set time in a display apparatus, such as a PD, installed in a public space or the like, where a light in the installation space is turned on and off at a specified time. In such a case, by applying the image setting in synchronization with the turn-on and turn-off of the light, setting application unlikely to give discomfort can be realized.

As another example, a change of the image signal, the ambient environment, or the like occurs at the set time, in image regarding arrival and departure time information which is often seen in public transportation. In this example, although there is no significant image change like that seen, for example, in the scene change, or the switching of broadcast channels or input signal sources, a change occurs in the arrangement of characters in the image, or the like, at a specified time. By applying an image setting in synchronization with the change in the arrangement of characters in the image, or the like, setting application unlikely to give discomfort can be realized.

It is also possible to use various timings unlikely to discomfort the viewer, depending on the installation environment. The user may perform setting in advance so that the image setting is automatically applied at these timings. Also a method may be employed in which the user gives instructions for switching of the setting by a direct operation or a remote operation using communication means at a user-determined time considered to be unlikely to give discomfort, and the image setting is applied in synchronization with the switching instruction operation.

Also, the image setting may be applied based on one of the above-mentioned specified timings unlikely to discomfort the viewer, or the setting may be applied when any combination of conditions for a plurality of timings are met.

It is also possible to change the timing for applying the image setting depending on a changing process of the final setting. This will be concretely described based on the settings illustrated in FIG. 2 and FIG. 3. A setting before an application will be denoted by PbBf, and a setting to be applied will be denoted by PbAf. For instance, PbBf is P(1) and PbAf is P(2). The timing may be prepared depending on the combination of PbBf and PbAf with consideration of the amount of change of each parameter due to the change of the setting, as illustrated in FIG. 6.

In the example illustrated in FIG. 6, the change of the image setting associated with the changing process from P(1) to P(2) is considered to be smaller than those in the other setting changing processes. The timing for the application is referred to as timing A. By setting the timing A to be a timing which is more likely to give discomfort than other timings but occurs frequently, prompt setting application can be realized while reducing discomfort as much as possible.

Another example regarding FIG. 6 will be described. The change of the image setting in the changing process from P(1) to P(4) is considered to be larger than those in the other setting changing processes. The timing for the application is referred to as timing C. By setting the timing C to be a timing which occurs less frequently than other timings but causes very little discomfort, image setting application with minimum discomfort can be realized although setting application may be delayed.

As above, by changing the timing for applying the image setting depending on the changing process from the current setting to the final setting to be applied next, more flexible image setting application can be realized.

There may be a case where discomfort cannot be reduced sufficiently by setting application at an available application timing, when a change of the image setting is larger than those of the other settings. In such a case, by following a procedure in which one or more intermediate settings are calculated based on PbBf and PbAf, the intermediate settings are applied in the image display apparatus in synchronization with a prescribed timing, in a step-by-step manner, until finally PbAf is reached, image setting less likely to give discomfort can be realized.

An intermediate setting will be described referring to the example of FIG. 3. When the change from Yc(2) to Yc(4) is to be performed, and if, for example, it is determined that a sufficient reduction of discomfort will not realized, image setting is performed via Yc(3) which is an intermediate curve between Yc(2) and Yc(4), as an intermediate setting regarding the brightness curve Yc(i). Such a method using the intermediate setting can be adopted not only with regard to Yc(i), but also for any other parameter of the image setting P(n).

In the above example, the existing brightness curve Yc(3) is used as the intermediate setting. However, instead of using an existing parameter, it is also possible to create a new parameter using an arithmetic operation and use the created parameter as the intermediate setting.

When it is attempted to apply the setting at the specified time, the application may be delayed for several frames. Such a delay for several frames will be referred to as a delay for a frames. There are several reasons for this delay. For instance, when there are many settings to be applied, the process for the application causes the delay. Also, an image signal may be delayed for several frames because a frame buffer is used for analyzing the image signal.

However, an effect caused by the delay for a frames is unlikely to be perceived by a human eye and unlikely to discomfort the viewer. Although it is preferable to apply the setting without delay, a sufficient effect can be obtained even when the setting is applied after the delay for $\alpha$ frames.

On the other hand, setting application performed within the $\alpha$ frames from the specified timing not discomforting the viewer can provide a sufficient effect. In view of this characteristic, it is also possible to determine whether the candidate setting Pa from the illuminance analyzer 5 is suitable for the latest illuminance value Lu(i) from the illuminance sensor group 3 for checking the validity of the final setting Pb, just before application of the final setting Pb.

Such a checking method is especially important where the timing not discomforting the viewer is specified based, for example, on the ambient environment. This is because, when the ambient environment changes, the brightness environment may also change significantly. In such a case, the final setting Pb which has been calculated based on the illuminance in the ambient environment before the change may not be suitable for the ambient environment after the change. When the check based on the latest illuminance value Lu(i) is performed just after the change of the ambient environment, the application can be performed only when it is determined that the setting is also suitable for the ambient environment after the change.

Using the example illustrated in FIG. 7, setting application associated with changes of an ambient environment and an image signal will be described. In this example, the changing ambient environment is weather, and the illuminance changes with the weather (FIG. 7(a)). The timing when the illuminance Lud changes from "large" to "middle" is denoted by T1, and the timing when the broadcast channel of the image signal of FIG. 7(b) is changed is denoted by T2. Furthermore, FIG. 7(c) shows a case where the setting is changed at the timing T1 (setting change 1), and FIG. 7(d) shows a case where the setting is changed at the timing T2 (setting change 2).

In this example, the setting change 1 lowers the display brightness setting in conformity with the illuminance at the timing T1, while the image signal represents the same scene. When the setting is changed in synchronization with the timing T1, the viewer is discomforted. On the other hand, the setting change 2 lowers the display brightness setting in conformity with the illuminance at the timing T2. At the timing T2, the content of the image signal is changed with the broadcast channel switching. When the setting change is performed at the same timing as the timing T2 or during the delay interval within a frames after the timing T2, the viewer is unlikely to be discomforted.

A-3. Advantage

According to the first embodiment of the present invention, a number of candidate settings obtained by the illuminance analyzer 5 corresponding to a predetermined time period are analyzed in the time-series direction, in the image display apparatus. Thus, even when the ambient brightness environment changes substantially, the image quality setting is not applied immediately, so that occurrence of an unnatural image such as a flickering image can be reduced.

Also, by applying the final setting calculated by the setting selector 6 in the image display apparatus at a specified timing unlikely to discomfort the viewer, an image quality setting can be performed without discomforting the viewer.

Furthermore, by determining the timing for applying the image setting depending on the changing process of the final setting, a more flexible image setting application can be realized.

The techniques described in the above Patent document 1 and Patent document 2 are intended to, when brightness is controlled, let the viewer perceive the brightness change. These methods may cause an unnatural image such as a flickering image in an image display apparatus in some environment.

Although the image display apparatus according to the first embodiment has been described using the illuminance change as a change of an ambient environment, a setting application method unlikely to discomfort the viewer may be applied to a case where the image setting is changed not only when a change of an ambient environment is detected based on the illuminance change, but also when a change of an environment is detected by any other method.

An example of another method of detecting an environmental change is to obtain a change of environment information, such as a lighting environment, the weather, and the viewer, through communication from outside the display apparatus. As another example, if a display apparatus such as a PD has an image setting to be set upon approach of the viewer, it is possible to detect movement or position of the viewer using an infrared sensor, an ultrasonic sensor, a video camera, or the like, and apply the image setting at a timing unlikely to give discomfort. Such a method may be used where, for instance, a display apparatus is provided with a touch panel, and the viewer's position is estimated from the touch position, and the image setting is changed based on the estimate.

The first embodiment may be used in various applications, by adjusting the timing for applying the image setting, depending on the intended purpose of an image display apparatus. For example, in the case of a PD used as an information terminal, the time period for which the image is watched is relatively short, so that it is preferable that the timing for application is set with a short delay, and the optimum setting has been applied when the image is seen by the viewer. When the same PD is used to display content such as a drama, the time period for which the image is watched is relatively long, so that the timing for application may be set with a relatively long delay.

Second Embodiment

B-1. Configuration of Image Display Apparatus

Figures 8, 9:
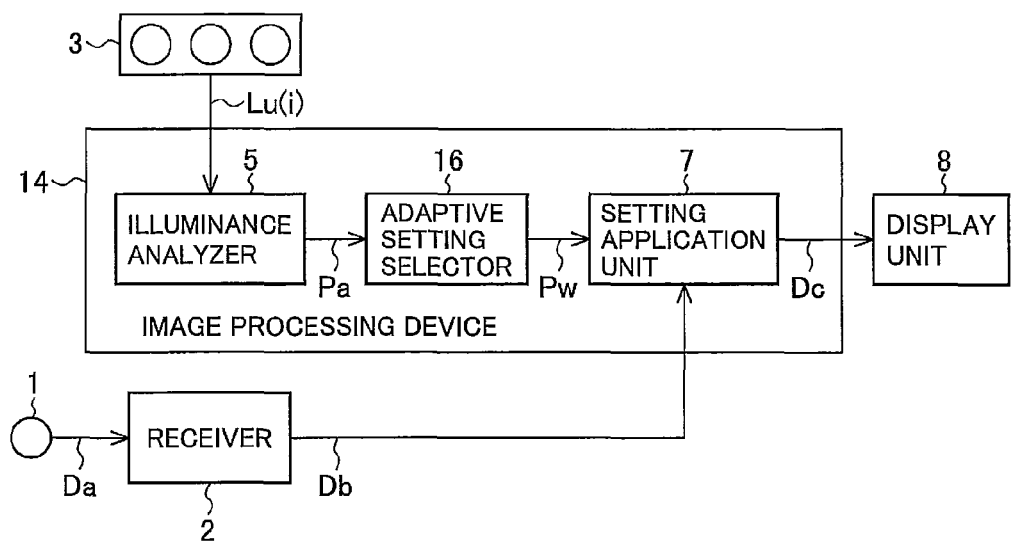
FIG. 8 is a block diagram illustrating a configuration of an image display apparatus according to a second embodiment of the present invention.
FIG. 9 is a diagram illustrating an example of a setting made for weighting, for explaining the operation of an adaptive setting selector according to the second embodiment of the present invention.

FIG. 8 is a block diagram illustrating a configuration of an image display apparatus according to a second embodiment of the present invention. The image display apparatus according to the second embodiment includes an image processing device 14 in place of the image processing device 4 in the image display apparatus according to the above-described first embodiment. The other components are the same as those illustrated in the first embodiment, and thus a description thereof will be omitted.

<B-1-1. Configuration of Image Processing Device 14>

The configuration of the image processing device 14 in the image display apparatus will be described below.

The image processing device 14 includes the illuminance analyzer 5, to which the illuminance value Lu(i) from the illuminance sensor group 3 is input, an adaptive setting selector 16, and the setting application unit 7, to which the image signal Db output from the receiver 2 is input.

The illuminance analyzer 5 selects an image setting from a prescribed plurality of image settings based on the illuminance value Lu(i) input from the illuminance sensor group 3 and outputs the selected image setting to the adaptive setting selector 16 as a candidate setting Pa.

The adaptive setting selector 16 determines the final setting Pw of the image setting in the image display apparatus, by analyzing a number of candidate settings Pa input from the illuminance analyzer 5 corresponding to a predetermined time period in the time-series direction, giving weights determined based on the time of day, sunshine conditions, the installation environment, or the characteristics of the viewer's vision, and outputs the final setting to the setting application unit 7.

The setting application unit 7 applies the final setting Pw input from the adaptive setting selector 16 as the image setting at a specified timing unlikely to discomfort the viewer. The setting application unit 7 performs a correction on the image signal Db obtained from the receiver 2 by using the image setting which has been set, and outputs the corrected image signal to the display unit 8 as the image signal Dc.

B-2. Operation of Image Processing Device 14

The operation of the image processing device 14 in the above-described image display apparatus will be described below.

The illuminance analyzer 5 according to the second embodiment is the same as that of the first embodiment and performs the same operation as that described in the first embodiment, and thus the detailed description of the operation thereof will be omitted.

The setting application unit 7 according to the second embodiment is the same as that of the first embodiment except that it receives the final setting Pw output from the adaptive setting selector 16 instead of receiving the final setting Pb output from the setting selector 6, and performs the same operation as that described in the first embodiment, and thus the detailed description of the operation thereof will be omitted.

<B-2-1. Operation of Adaptive Setting Selector 16>

The operation of the adaptive setting selector 16 provided in the image processing device 14 will be described below.

The adaptive setting selector 16 determines the final setting Pw for use as the image setting in the image display apparatus, by analyzing a number of candidate settings Pa input from the illuminance analyzer 5 corresponding to a predetermined time period in the time-series direction, giving weights determined based on the time of day, sunshine conditions, the installation environment, or the characteristics of the viewer's vision. Here, the weight which is determined depending on the conditions will be referred to as an environment variable w, and the condition value defining the number corresponding to the predetermined time period will be denoted by m. The operation related to the condition value m in the adaptive setting selector 16 is the same as that described in the first embodiment, and thus the detailed description thereof will be omitted.

Weighting by the environment variable w will be described. The environment variable is changed with the time of day, for instance, in the case of a PD located outdoors. In such a case, the illuminance is significantly high due to direct sunlight in the daytime, and is of a low value in the night unless a light such as an electric light is provided. Considering the effect of sunlight, at a time around daybreak, the ambient illuminance changes from a low illuminance value to a high illuminance value (it becomes bright). In contrast, at a time around sunset, the ambient illuminance changes from a high illuminance value to a low illuminance value (it becomes dark).

In the above-described environment, at a time of daybreak, it is highly unlikely that the illuminance value changes from a high illuminance value to a low illuminance value (it becomes dark), and the environment variable w is adjusted so that it is more likely to change to a setting for a bright environment. Also, the environment variable w is adjusted so that it is less likely to change to a setting for a dark environment. In the following example, the larger the environment value w is than a standard value, the harder the setting is to change, and conversely, the smaller the environment value w is than the standard value, the easier the setting is to change. In this example, the standard value of the environment variable w is assumed to be equal to 1.

The weight used when the image setting is changed from P(WBf) to P(WAf) will be called an environment variable w(WBf−WAf). For example, w(P1−P4) denotes the weight for the case where the image setting is changed from P(1) to P(4). Here, like the example illustrated in FIG. 2, P(1) is a setting for a high illuminance, and P(4) is a setting for a low illuminance.

FIG. 9 illustrates an example of a setting of the environment variable. A setting in the above-described time of daybreak is represented against a condition 1 and a condition 2. When a time condition is from 5 AM to 7 AM, w(P4−P1) is set to be 0.5, while w(P1−P4) is set to be two.

By multiplying the condition value m defining the number corresponding to the predetermined time period by the environment variable w, setting determination more suitable for the environment becomes possible. For example, when the condition value is equal to 30, and if the condition for weighting is not satisfied, all of the settings can be selected equally.

When the environment variables are set as shown in FIG. 9, and when the time condition of from 5 AM to 7 PM is satisfied, the condition value obtained by multiplying the condition value m by w(P4−P1)=0.5 becomes w(P4−P1)m=15, so that the image setting becomes more likely to change from P(4) to P(1) than when the time condition is not satisfied. In contrast, the condition value obtained by multiplying the condition value m by w(P1−P4)=2 becomes w(P1−P4)m=60, so that the image setting becomes less likely to change from P(1) to P(4) than when the time condition is not satisfied.

By the use of the environment variable w for the weighting, an image setting suitable for the installation environment becomes more likely to be selected. Conversely, it is less likely to change to an image setting not suitable for the environment.

In order to generate the environment variable w, environment information which cannot be obtained by the display apparatus alone may be sent through communication from outside. This may be the case for information regarding the time of day, the weather, or the like.

Another example of the weighting based on the environment variable w will be described. An example in which the environment variable is changed depending on human visual characteristics will be illustrated. The human visual characteristics have light adaptation and dark adaptation. The time period required to adapt to the dark environment upon a change from a bright environment is longer than that required to adapt to the light environment upon a change from a dark environment. It is therefore possible to determine the environment variables w with consideration of such human visual characteristics.

The environment variables w with consideration of the light adaptation and the dark adaptation will be specifically described. Unlike the example of FIG. 2 used in the first embodiment, two kinds of image setting as illustrated in FIG. 10 will be used in order to simplify the description. The settings as shown in FIG. 10 assume a state where two illuminance sensors are provided, but one illuminance sensor is shielded, that is, the illuminance sensor for Lu(2) is off.

In this example, P(1) is a setting for a bright ambient environment, and P(2) is a setting for a dark ambient environment. Given the visual characteristics, because it takes time for adaptation upon a change from a bright environment to a dark environment, the change from the setting P(1) for a bright ambient environment to the setting P(2) for a dark ambient environment may be effected taking a longer time. Conversely, it is possible to effect a change from the setting P(2) for a dark ambient environment to the setting P(1) for a bright ambient environment in a relatively short time.

Thus, it is possible to give weights as illustrated in FIG. 11, i.e., to set the environment variable w(P1−P2) for the dark adaptation to be large, so that the change takes time, and to set the environment variable w(P2−P1) for the light adaptation to be small, so that the setting is applied in a short time.

B-3. Advantage

According to the second embodiment of the present invention, a number of candidate settings obtained by the illuminance analyzer 5 corresponding to a predetermined time period are analyzed in the time-series direction, in the image display apparatus. Thus, even when the ambient brightness environment changes substantially, the image quality setting is not applied immediately, so that occurrence of an unnatural image such as a flickering image can be reduced.

Also, by applying the final setting calculated by the adaptive setting selector 16 in the image display apparatus at a specified timing unlikely to discomfort the viewer, an image quality setting can be performed without discomforting the viewer.

Furthermore, by determining the timing for applying the image setting depending on the changing process of the final setting, a more flexible image setting application can be realized.

Furthermore, by changing weighting based on the time of day, sunshine conditions, or the installation environment, and analyzing a number of candidate settings corresponding to a predetermined time period in the time-series direction with consideration of the weight, it becomes more likely to change the image setting to be more suitable for the environment. A further advantage is that it becomes less likely to change the image setting to be unsuitable for the environment.

In addition, by changing weighting based on the characteristics of the viewer's vision, and analyzing a number of candidate settings corresponding to a predetermined time period in the time-series direction with consideration of the weight, it is possible to realize application of the image setting more appropriate to the visual characteristics, without giving discomfort.

The techniques described in the above Patent document 1 and Patent document 2 are intended to, when brightness is controlled, let the viewer perceive the brightness change. These methods may cause an unnatural image such as a flickering image in an image display apparatus in some environment.

Although the image display apparatus according to the second embodiment has been described using the illuminance change as a change of an ambient environment, a setting application method unlikely to discomfort the viewer may be applied to a case where the image setting is changed not only when a change of an ambient environment is detected based on the illuminance change, but also when a change of an environment is detected by any other method.

An example of another method of detecting an environmental change is to obtain a change of environment information, such as a lighting environment, the weather, and the viewer, through communication from outside the display apparatus. As another example, if a display apparatus such as a PD has an image setting to be set upon approach of the viewer, it is possible to detect movement or position of the viewer using an infrared sensor, an ultrasonic sensor, a video camera, or the like, and apply the image setting at a timing unlikely to give discomfort. Such a method may be used where, for instance, a display apparatus is provided with a touch panel, and the viewer's position is estimated from the touch position, and the image setting is changed based on the estimate.

The second embodiment may be used in various applications by adjusting the timing for applying the image setting, depending on the intended purpose of an image display apparatus. For example, in the case of a PD used as an information terminal, the time period for which the image is watched is relatively short, so that it is preferable that the timing for application is set with a short delay, and the optimum setting has been applied when the image is seen by the viewer. When the same PD is used to display content such as a drama, the time period for which the image is watched is relatively long, so that the timing for application may be set with a relatively long delay.

EXPLANATION OF REFERENCE CHARACTERS 1 input terminal; 2 receiver; 3 illuminance sensor group; 4, 14 image processing device; 5 illuminance analyzer; 6 setting selector; 7 setting application unit; 8 display unit; 16 adaptive setting selector.

What is claimed is:

1. An image display apparatus for correcting an input image signal and displaying an image on a display unit based on the corrected image signal, comprising:
   at least one illuminance detector for sequentially detecting illuminance values around the image display apparatus;
   an illuminance analyzer for sequentially outputting candidate settings for correction of the image signal based on the sequentially detected illuminance values;
   a setting selector for setting a threshold value and outputting the final image setting based on one of the candidate settings which has been output a number of times greater than the threshold value; and
   a setting application unit for changing the image setting used to correct the image signal to be equal to the final setting output from the setting selector, when a predetermined change occurs in the input image signal or when a predetermined time has come;
   wherein the setting selector sets different values for the threshold value for the candidate setting corresponding to the detected illuminance value higher than the detected illuminance value corresponding to the current image setting, and the threshold value for the candidate setting corresponding to the detected illuminance value lower than the detected illuminance value corresponding to the current image,
   wherein the setting selector sets the threshold value based on time information, and
   wherein:
      when the time information indicates a time around daybreak, the setting selector sets the threshold value for the candidate setting corresponding to the detected illuminance value higher than the detected illuminance value corresponding to the current image setting, to be lower than the threshold value for the candidate setting corresponding to the detected illuminance value lower than the detected illuminance value corresponding to the current image setting; and
      when the time information indicates a time around sunset, the setting selector sets the threshold value for the candidate setting corresponding to the detected illuminance value lower than the detected illuminance value corresponding to the current image setting, to be lower than the threshold value for the candidate setting corresponding to the detected illuminance value higher than the detected illuminance value corresponding to the current image setting.

2. The image display apparatus according to claim 1, wherein the predetermined change is an occurrence of a scene change.

3. The image display apparatus according to claim 1, wherein the predetermined change is a change by switching of broadcast channels or input signal sources.

4. The image display apparatus according to claim 1, wherein the setting application unit changes a timing for changing the current image setting to be equal to the final image setting output from the setting selector based on a difference between the final image setting output from the setting selector and the current image setting.

5. The image display apparatus according to claim 1, wherein the setting application unit determines an intermediate value between the current image and the final image setting output from the setting selector, changes the current image setting to be equal to the intermediate value, and then to be equal to the final image setting output from the setting selector.

* * * * *